…

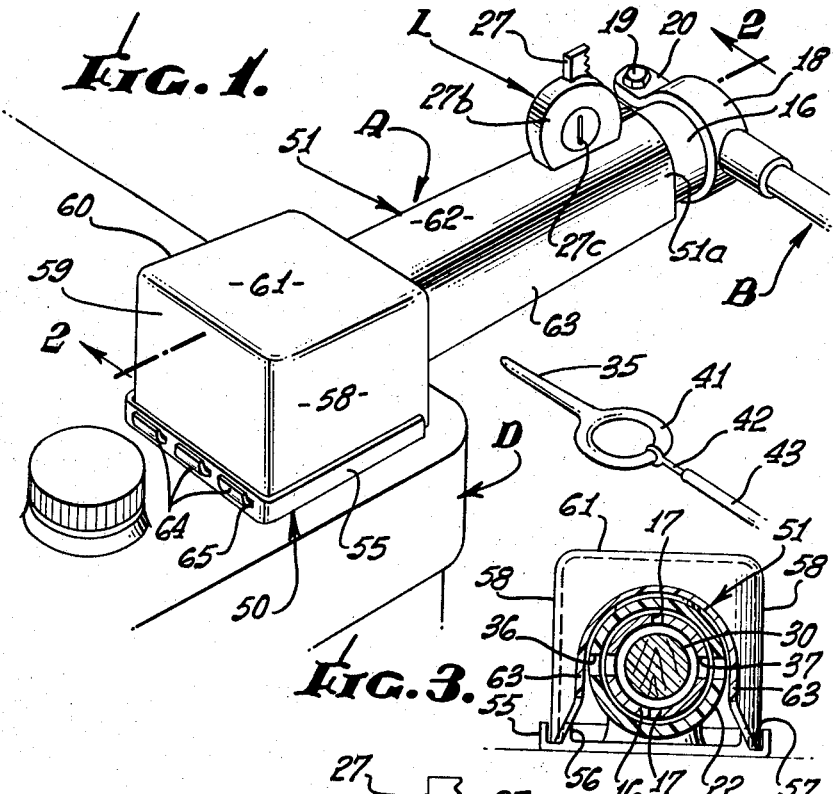
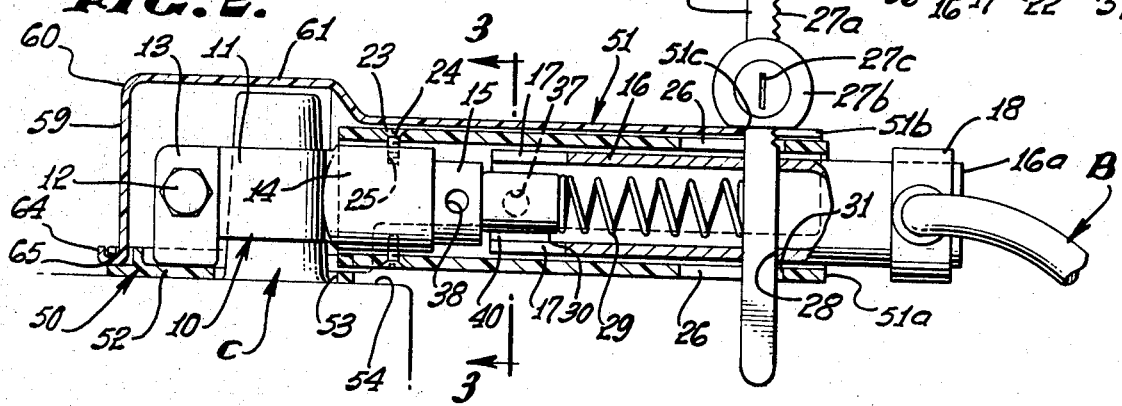

United States Patent Office 3,535,899
Patented Oct. 27, 1970

3,535,899
ANTI-THEFT BATTERY DISCONNECT DEVICE
Newell J. Gardner, 6505 Wilshire Blvd., Los Angeles, Calif. 90048, and William R. Lastinger, Austin, Tex. (P.O. Box 75366, Los Angeles, Calif. 90005)
Filed Mar. 11, 1968, Ser. No. 714,163
Int. Cl. E05b 65/12
U.S. Cl. 70—258  10 Claims

ABSTRACT OF THE DISCLOSURE

An anti-theft battery disconnect device in which a housing is removably connected to a base secured in place on the battery by the terminal clamp of a disconnect device having telescope conductive members held in contact with one another by a releasable pin. The conductive members are urged one from the other by a spring and are reengageable by manual force applied to an arm projecting laterally from the movable member. The housing providing an abutment in the path of the arm to prevent reengagement of the conductive members and a lock is applied to the arm to prevent removal of the housing until the lock has first been removed.

---

It is frequently desirable that battery operated or assisted vehicles, such as automobiles, boats, golf carts, and the like, be provided with battery disconnect means whereby the entire electrical system may be disconnected from the battery. Such disconnection is desirable, for example, in the event of a short circuit which has caused or may cause fire, or when the vehicle is to be left idle for a period of time.

In the latter case, moreover, it is desirable that unauthorized use of the vehicle be prevented. However, the ignition systems of internal combustion engine powered motor vehicles and boats, as well as the main switches of battery powered vehicles, while being superficially protected against unauthorized operation by the provision of key operated ignition or main switches, are subject to passing the switches with a "jumper," i.e., connecting a unauthorized operation by the simple expedient of by-wire in the circuit between the battery and the key controlled switch. In addition, ignition or other switch keys may be obtained by persons intent on thievery of vehicles, boats, and the like.

The present invention provides an anti-theft battery disconnect device adapted to thwart the usual efforts of a thief in two manners. First, the battery is disconnected at one of the battery posts, say at the negative post by a battery disconnect means, thus rendering useless efforts to employ master keys or ignition jumper wires; and, second, a housing is locked about the battery disconnect to prevent reengagement of the disconnect, except following removal of the housing.

In accomplishing the foregoing, an anti-theft disconnect device is provided having relatively few components. Accordingly, the device is simple to manufacture, install, and operate, as well as being certain in its operation, and inexpensive.

More particularly, the invention provides an anti-theft housing in combination with a battery disconnect, wherein a housing base is secured to a battery post by the battery terminal clamp of the disconnect device, the remainder of the housing being readily and conveniently removably attachable to the base so as to enclose the battery disconnect within a protective housing to prevent operation of the disconnect for the purpose of reestablishing the battery circuit, as well as to prevent connection of a jumper to the battery post. In the use of the vehicle, moreover, the battery disconnect serves the purpose of enabling substantially instantaneous disconnection of the battery, as may be necessary or desirable, for example, in the case of a short circuit or fire.

In addition, in accomplishing the foregoing, the removable housing is adapted to cooperate with the reset means for normally operating the battery disconnect to connect the battery in the circuit. In this connection, a movable portion of the battery disconnect is blocked against movement by a portion of the housing. Furthermore, the housing is retained against unauthorized removal by a locking means applicable to the movable reset member of the battery disconnect.

More specifically, the invention contemplates the application of the anti-theft housing, as referred to above, to a battery disconnect of the type shown and described in our pending application for Letters Patent of the United States, filed Dec. 6, 1967, Ser. No. 688,456, entitled, Quick Disconnect Battery Apparatus.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention.

Referring to the drawings:

FIG. 1 is an isometric view showing the anti-theft disconnect device in conjunction with a battery;

FIG. 2 is a vertical section taken on the line 2–2 of FIG. 1;

FIG. 3 is a vertical section taken on the line 3–3 of FIG. 2; and

FIG. 4 is a top plan view of the device.

As disclosed in the drawings, an anti-theft, quick disconnect apparatus A is interposed between the battery cable B and a post C of a battery D. The cable B, as is known, would be employed in the circuit by which the battery D is connected to various instrumentalities of a vehicle, such as to the starter motor, ignition system, and the like, of an automobile or boat, and to the motor controls and main switch of a battery powered vehicle, such as a golf cart.

Included in the anti-theft disconnect apparatus A is a quick disconnect device, which is herein shown as constructed and operable in accordance with the disclosure of our above-mentioned pending application. Thus, the disconnect includes a battery connector 10 having a terminal clamp 11 adapted to be clamped over the terminal post C of the battery through tightening of the usual bolt 12 extending through the wings 13 of the clamp. This connector has a cylindrical portion 14 merging into a reduced diameter portion 15 which, when the disconnect is connected, is piloted within a conductive sleeve 16 that frictionally engages the periphery of the reduced diameter portion 15. Such engagement is assured by providing diametrically opposed longitudinal slits 17 in the sleeve opening through its end, so that the sleeve tends inherently to resiliently grip the reduced diameter portion of the battery connector.

The usual terminal clamp 18 of the battery cable B is secured about the outer end 16a of the conductive sleeve by a bolt 19 extending through and engaging the opposed wings or ears 20 of the terminal clamp 18. Accordingly, when the conductive sleeve 16 is engaged with the portion 15 of the connector 10, an electro-conductive connection is completed between the battery cable B, through its terminal clamp 18, and the conductive sleeve 16, and between the conductive sleeve, through the battery connector 10, and the negative terminal post C of the battery D.

Surrounding the conductive sleeve 16 and the cylindrical portions 14, 15 of the battery connector 10 is a housing or disconnect body 22 made of suitable insulating material, this housing extending from the terminal clamp 11 of the battery connector to the outer portion 16a of the conductive sleeve 16 when the parts are assembled, leaving the outer portion 16a of the conductive sleeve exposed for reception of the terminal clamp 18 of the battery cable B. The housing 22 is secured to the battery connector 10 by a plurality of screws 23 extending through holes 24 in the housing and threaded into companion holes 25 in the battery connector. The housing is also provided with diametrically opposed longitudinal slots 26, axially spaced from the battery connector 10, and through which extend a reset crosspiece and spring seat member 27, which is preferably made of insulation material, and which has arms extending through radial holes 28 in the conductive sleeve 16, being suitably secured to the sleeve. This crosspiece serves as a seat for a helical compression spring 29 bearing thereagainst at one end, the opposite end of the spring bearing against a thrust member 30 of insulating material, such as a wood dowel, that bears against the end of the reduced diameter portion 15 of the battery connector 10. As shown in FIG. 2, the spring 29 tends to expand and acts through the crosspiece 27 to shift the conductive sleeve 16 axially away from the battery connector 10, to remove the conductive sleeve 16 axially from and to a spaced relation relative to the reduced diameter portion 15 of the battery connector, the extent of separation being limited by engagement of the arms of the crosspiece 27 with the ends 31 of the housing slots 26 along which the crosspiece is slidable.

The apparatus A is normally retained in a condition in which the conductive sleeve 16 surrounds and engages the reduced diameter portion 15 of the battery connector by a coupling pin 35 adapted to extend through aligned holes 36, 37, 38 provided in the housing 22, conductive sleeve 16, and reduced diameter portion 15 of the battery connector 10, respectively. This coupling pin 35 will retain the parts in the relative positions in which the battery cable B is electrically connected with the negative terminal post C, and will retain the spring 29 in its compressed condition, preventing its expansion and disconnection between the conductive sleeve 16 and the battery connector 10.

When the pin 35 is pulled from the holes 36, 37, 38, the spring 29 expands, shifting the sleeve 16 axially away from the battery connector 10, or to the disconnected position illustrated in FIG. 2, the extent of expansion of the spring being limited by engagement of the crosspiece 27 with the housing 22 at the outer ends 31 of the diametrically opposite slots 26. When in this condition, the spring retains the insulated thrust member 30 engaged with the end of the battery connector 10 and will retain the end 40 of the conductive sleeve 16 longitudinally spaced from the end of the reduced diameter portion 15 of the battery connector 10, the parts remaining in such condition until the reset member 27 is manually moved to the left to align holes 36, 37 and 38, and the pin 35 reinserted therein.

As illustrated, the coupling pin 35 can be pulled from the holes 36, 37, 38 from a remote location by an outer eye or loop 41 connected to a pull wire 42 that extends through a suitable elongate housing 43 running to a convenient location, such as the dash of a vehicle or boat.

From the foregoing description, it is evident that in the event of a hazardous condition, such as the breaking of a fuel line or a spark being produced by a live wire, or from another source, the electrical system can be completely and very quickly deenergized, merely by pulling the coupling pin 35 from the holes 36, 37, 38. The pull wire 42 is preferably arranged in such a manner that the pull is exerted axially of the coupling pin, enabling it to be easily removed to allow the helical spring 29 to expand, this spring having ample spring force to overcome the frictional engagement of the conductive sleeve 16 with the reduced diameter portion 15 of the battery connector 10.

In accordance with the present invention, the apparatus A includes anti-theft means adapted to be combined with disconnect means, such as that described above, to prevent resetting of the conductive sleeve 16 in engagement with the portion 15 of the connector 10. The anti-theft means includes a housing base 50 and a housing 51 adapted to be connected to the battery without special fastenings, but yet securely, in a tamper-proof manner. More specifically, the housing base 50 comprises a base plate or wall 52 having an opening 53 that allows the base plate to be disposed upon the upper surface 54 of the battery D, with the post C extended upwardly through the opening 53. The connector 10 provides means for retaining the base plate 52 in place, for example, by abutting engagement of the ears 13 of the clamp 11 with the base plate 52. The base plate 52 is also composed of insulating material to prevent electrical contact with the post C.

About the remainder of its periphery, the base plate 52 has upwardly projecting inner and outer parallel walls 55 and 56 forming a channel 57 adapted to receive the side walls 58, 58 and the end wall 59 of a domed end portion 60 of the housing 51. The domed end portion also includes an upper wall 61 adapted to be disposed in upwardly spaced relation to the battery post C when the side walls 58, 58 and end wall 59 of the domed portion 60 of the housing 51 are seated in the channel 57 provided by the housing base 50.

In addition, the housing 51 comprises an elongate portion 62 having downwardly extended side walls 63, 63 formed integrally with the domed portion 60 and adapted to extend longitudinally in overlying relation to the disconnect body 22. The housing 51, like the disconnect body 22 and the base 50, is composed of insulating material.

Means are provided for conveniently and releasably interconnecting the housing 51 with the housing base 50. In the illustrative embodiment, the end wall 59 of the domed portion 60 of the housing is provided with a number of spaced ears or tongues 64 which project outwardly and then upwardly from the wall 59. The outer end wall 55 of the housing base 50 is provided with slots 65, corresponding in number and spacing to the ears 64. Thus, it is apparent that the housing 51, when released as hereinafter to be described, may be readily removed from the base 50 by a simple upward swinging movement of the housing about the slots 65 of the wall 55 until the ears 64 slip out from the slots 65.

As herein shown, however, such pivotal movement of the housing can be prevented. The housing is retained in place over the battery post C and the disconnect body 22 by lock means L. This lock means is of conventional form, requiring no specific description herein, except to note that the upwardly extended reset arm 27, along one edge, is provided with teeth 27a, and a lock 27b of a conventional ratchet type, is adapted to ratchet onto the arm 27 and engage the teeth 27a, is also engaged with the housing wall 62 to prevent the above-described swinging removal of the housing 51 until the lock 27b is first removed. This lock 27b is shown as including a key slot 27c for reception of a key for releasing the lock.

In order to permit movement of the housing 51 as aforesaid, the free end 51a thereof is provided with a slot 51b through which the upwardly extended reset arm 27 extends. The slot 51b terminates in an abutment wall 51c, which, when the housing 51 is in the applied position as shown, prevents movement of the reset arm 27 in the resettng direction against the force of the spring 29. Thus, the conductive sleeve 16 is held in a disconnected position, at which its contact end 40 is spaced from the connector portion 15.

In the use of the anti-theft disconnect apparatus described above, when the battery post C is to be electroconductively connected to the battery cable B, the lock means L is first unlocked, and the lock 27b removed upwardly from the toothed arm 27 to free the end 51b of the housing 51. The housing 51 is then free to permit the end 51b to be lifted to cause pivotal movement of the housing 51 about the ears 64 thereof a sufficient distance to cause the upwardly projecting reset arm 27 to be free from abutting relation to the slot end 51c, or, if desired, the housing 51 may be fully removed from the base 50. Resetting movement of the arm 27 against the force of the spring 29 will then cause gripping engagement of the conductive member 16 with the connector portion 15 and alignment of the pin openings 36, 37, and 38, wherein the pin 35 may be inserted therethrough to maintain the electrical connection.

In the event of an emergency requiring rapid disconnection of the battery D from the cable B, simple pulling of the pin 35 from the openings 36, 37, 38 will effect the desired result. The same action, namely, pulling of the pin 35, will disconnect the battery when the vehicle is to be idle for a period of time, and, in order to prevent unauthorized electrical reconnection of the cable B to the battery D, the anti-theft housing is reapplied by reinserting the ears 54 into the end channel 57 and through the slots 65, the housing then being pivoted down over the post C and the disconnect mechanism to the position disclosed in the drawings, the reset arm 27 extending through the housing slot 51b. The lock 27b is then slipped over the ratchet arm 27 into engagement with the housing 51 to lock it in place. Under these circumstances, any use of a master key in the ignition or main switch of the vehicle, or any usual effort to jump the ignition or main switch, will be futile. Moreover, the anti-theft disconnect apparatus A fully encloses and protects the post C from access by a jumper wire leading to the terminal clamp 18.

We claim:

1. Anti-theft battery disconnect apparatus comprising: disconnect means connectible to a battery cable and to a battery post, and including an electroconductive shiftable member in the electric circuit between said battery cable and post and movable to positions at which said cable and post are electroconductively connected and disconnected, a movable housing enclosing said disconnect means and engaged by said shiftable member to hold said member in its position at which said cable and post are electroconductively disconnected and to prevent movement of said member to the position at which said cable and post are electroconductively connected, and lock means for preventing movement of said housing from its position at which it is engaged by said shiftable member.

2. Anti-theft battery disconnect apparatus a defined in claim 1, wherein said lock means includes a lock carried by said shiftable member and engaged with said housing.

3. Anti-theft battery disconnect apparatus comprising: disconnect means connectible to a battery cable and to a battery post, and including a shiftable member movable to positions at which said cable and post are electroconductively connected and disconnected, a movable housing enclosing said disconnect means and engageable by said shiftable member to prevent movement of said member to the position at which said cable and post are electroconductively connected, and lock means for preventing movement of said housing, wherein said shiftable member includes an arm, said housing having a slot through which said arm extends, said arm being engageable with said housing at an end of said slot, and said lock means includes a lock carried by said arm.

4. Anti-theft battery disconnect apparatus as defined in claim 3, and said lock means being a ratchet lock, said arm having ratchet teeth engageable by said ratchet lock.

5. Anti-theft battery disconnect apparatus comprising: disconnect means connectible to a battery cable and to a battery post, and including a shiftable member movable to positions at which said cable and post are electroconductively connected and disconnected, a movable housing enclosing said disconnect means and engageable by said shiftable member to prevent movement of said member to the position at which said cable and post are electroconductively connected, and lock means for preventing movement of said housing, wherein said housing includes a base plate having an opening for said battery post, said disconnect means including a connector clamp engageable with said post above said base plate for securing said base plate relative to said post, nd means also including a portion for covering said post, and means for movably connecting said portion of said housing to said base plate to permit movement of said housing to a position at which said shiftable member is movable to said position electroconductively connecting said cable said post.

6. Anti-theft battery disconnect apparatus as defined in claim 5, said base plate having walls defining a channel at the periphery of said plate, and said housing having walls engageable in said channel.

7. Anti-theft battery disconnect apparatus as defined in claim 5, said means movably connecting said portion of said housing to said base plate including a wall on said base plate, a wall on said housing, one of said walls having a slot, and the other of said walls having an ear projecting therefrom through said slot.

8. Anti-theft battery disconnect apparatus as defined in claim 5, said means movably connecting said portion of said housing to said base plate including a wall on said base plate, a wall on said housing, one of said walls having a number of slots therein, the other of said walls having a like number of outwardly and upwardly extended ears projecting therefrom through said slots, whereby said housing is adapted to swing about said wall on said base plate upon movement of said housing to said position enabling movement of said shiftable member to a position for electroconductively connecting said cable to said post.

9. In anti-theft battery disconnect apparatus engageable with a battery post and with a battery cable, a housing base of insulating material disposed about said post, electrical connector means for engaging said post and holding said base in position relative to said post, disconnect means carried by said connector means including an insulating body, a conductive member carried by said body and shiftable into and out of engagement with said connector means, said connector means, said conductive member, and said body having openings alignable for reception of a pin when said conductive member is engaged with said connector means, means normally holding said conductive member out of engagement with said connector means, a reset member carried by said conductive member for moving the latter into engagement with said connector means, housing means shiftably connected to said base and having a portion covering said post and said connector means, said housing means also having a portion engageable by said reset member to effect engagement of said conductive member with said connector means, and releasable lock means for holding said housing means in a position with said portion of said housing means engaged by said reset member.

10. Anti-theft battery disconnect apparatus as defined in claim 9, wherein said lock means includes ratchet teeth on said reset member, and a ratchet lock engageable with said teeth.

References Cited

UNITED STATES PATENTS

| | | | |
|---|---|---|---|
| 1,527,625 | 2/1925 | Blake | 136—1 |
| 1,558,491 | 10/1925 | Morfoot | 136—135 |
| 1,583,609 | 5/1926 | Sapers | 136—181 |
| 1,654,450 | 12/1927 | Blake | 307—10 |

MARVIN A. CHAMPION, Primary Examiner

R. L. WOLFE, Assistant Examiner

U.S. Cl. X.R.

70—159; 136—181; 339—37